US012584690B2

(12) United States Patent
Kawashiri et al.

(10) Patent No.: US 12,584,690 B2
(45) Date of Patent: Mar. 24, 2026

(54) LIQUID LEVEL DETECTION METHOD AND DETECTION APPARATUS FOR THE SAME, MOLTEN MATERIAL LIQUID LEVEL DETECTION METHOD AND DETECTION APPARATUS FOR THE SAME, AND METHOD FOR OPERATING VERTICAL FURNACE

(71) Applicant: JFE STEEL CORPORATION, Tokyo (JP)

(72) Inventors: Yuki Kawashiri, Tokyo (JP); Tetsuya Yamamoto, Tokyo (JP); Kazuhira Ichikawa, Tokyo (JP); Taihei Nouchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 235 days.

(21) Appl. No.: 18/274,814

(22) PCT Filed: Jan. 13, 2022

(86) PCT No.: PCT/JP2022/000872
§ 371 (c)(1),
(2) Date: Jul. 28, 2023

(87) PCT Pub. No.: WO2022/168557
PCT Pub. Date: Aug. 11, 2022

(65) Prior Publication Data
US 2024/0118029 A1 Apr. 11, 2024

(30) Foreign Application Priority Data
Feb. 3, 2021 (JP) ................................. 2021-015652

(51) Int. Cl.
*G01F 23/22* (2006.01)
*C03B 5/00* (2006.01)
(Continued)

(52) U.S. Cl.
CPC ............ *F27B 1/28* (2013.01); *F27D 21/0028* (2013.01); *G01F 23/22* (2013.01)

(58) Field of Classification Search
CPC ............................ C03B 5/245; F27D 21/0028
See application file for complete search history.

(56) References Cited

U.S. PATENT DOCUMENTS 4,378,993 A    4/1983   Fukushima et al.
6,434,495 B1    8/2002   Kitamura et al.
(Continued)

FOREIGN PATENT DOCUMENTS

CN    100430698 C    11/2008
CN    104673949 A    6/2015
(Continued)

OTHER PUBLICATIONS

Brannbacka, Johnny, and Henrik Saxen. "Novel model for estimation of liquid levels in the blast furnace hearth." Chemical engineering science 59.16 (2004): 3423-3432.*
(Continued)

*Primary Examiner* — Herbert K Roberts
(74) *Attorney, Agent, or Firm* — Oliff PLC

(57) ABSTRACT

A molten material liquid level detection method that can detect a liquid level of molten material from a residual amount of the molten material with high accuracy and a method for operating a vertical furnace by using the detection method. The molten material liquid level detection method detects a liquid level of molten material remaining in a bottom portion of a vertical furnace after end of discharge of a molten material. The molten material liquid level detection method includes calculating a void fraction of the solid-filled structure, and detecting a liquid level of the molten material after the end of the discharge by using (Continued)

the calculated void fraction and a residual amount of the molten material after the end of the discharge.

8 Claims, 2 Drawing Sheets

(51) Int. Cl.
    *F27B 1/28*         (2006.01)
    *F27D 21/00*      (2006.01)

(56)                References Cited

U.S. PATENT DOCUMENTS

| | | |
|---|---|---|
| 6,576,039 B2 | 6/2003 | Koffron et al. |
| 2011/0156326 A1 | 6/2011 | Fujimoto et al. |

FOREIGN PATENT DOCUMENTS

| | | |
|---|---|---|
| CN | 105277334 A | 1/2016 |
| CN | 206521492 U | 9/2017 |
| CN | 110628974 A | 12/2019 |
| JP | S51-27809 A | 3/1976 |
| JP | S56-69313 A | 6/1981 |
| JP | 2006-176805 A | 7/2006 |
| JP | 2015-206107 A | 11/2015 |
| JP | 2017-160498 A | 9/2017 |
| KR | 10-2000-0042525 A | 7/2000 |
| KR | 102102470 B1 | 5/2020 |
| TW | 201012936 A | 4/2010 |

OTHER PUBLICATIONS

Stel et al. Blast furnace sustained tapping practice (SustainTap), et al. Blast furnace sustained tapping practice (SustainTap). Publications Office of the European Union, 2016.*

Kaymak Y, Adam J, Hauck T, Lin R, Mernitz J, Kanniala R, Saxen H, Mattila O, Zaimi SA, Carrascal CJ, Munoz JM, Ökvist LS, Lundqvist M, Perini PG & Faraci E (2012) Improvement of hearth drainage efficiency and refractory life for high BF productivity and a well-adjusted reductant injection rate at varying coke qual.*

Brannbacka, Johnny, and Henrik Saxén. "Model analysis of the operation of the blast furnace hearth with a sitting and floating dead man." ISIJ international 43.10 (2003): 1519-1527.*

Assima, G. P., et al. "Liquid drainage in inclined packed beds—accelerating liquid draining time via col. tilt." Chemical Engineering and Processing: Process Intensification 95 (2015): 249-255.*

Brannbacka, Johnny, and Henrik Saxén. "Modeling the liquid levels in the blast furnace hearth." ISIJ international 41.10 (2001): 1131-1138.*

Torrkulla, Jan, et al. "Indicators of the internal state of the blast furnace hearth." ISIJ international 42.5 (2002): 504-511.*

Kaymak, Y., et al. "Simulation of Slag/Gas and Slag/Iron Interface Tilting in Blast Furnace Hearth During Slag Tapping." Comsol Conference Rotterdam, at Rotterdam. 2017.*

Shao, Lei, et al. "Dead-man behavior in the blast furnace hearth—A brief review." Processes 8.11 (2020): 1335.*

Feb. 15, 2022 International Search Report issued in International Application No. PCT/JP2022/000872.

May 28, 2025 Office Action issued in Korean Patent Application No. 10-2023-7025337.

Jan. 18, 2023 Office Action issued in Taiwanese Patent Application No. 111102794.

Apr. 4, 2024 Office Action issued in European Patent Application No. 22749434.1.

Nov. 16, 2025 Office Action issued in Chinese Patent Application No. 202280011795.9.

Jan. 28, 2026 Office Action issued in Chinese Patent Application No. 202280011795.9.

* cited by examiner

LIQUID LEVEL DETECTION METHOD AND DETECTION APPARATUS FOR THE SAME, MOLTEN MATERIAL LIQUID LEVEL DETECTION METHOD AND DETECTION APPARATUS FOR THE SAME, AND METHOD FOR OPERATING VERTICAL FURNACE

TECHNICAL FIELD

This application relates to liquid level detection method and detection apparatus for the same, molten material liquid level detection method and apparatus for detecting a liquid level of molten material in a vertical furnace, and a method for operating a vertical furnace.

BACKGROUND

For example, in a vertical furnace such as a blast furnace, iron ore and coke, which are raw materials, are charged into the blast furnace through a furnace top, and a hot blast is blown into the furnace through a tuyere provided in a lower portion of the furnace. The coke is burned by the hot blast blown into the furnace through the tuyere, and thereby high-temperature reducing gas is generated. This high-temperature reducing gas melts and reduces the iron ore, and thereby molten pig iron is produced. The molten pig iron and molten slag (hereinafter sometimes referred to as "slag") obtained as a by-product when the molten pig iron is produced are accumulated in a bottom portion of the furnace and are discharged through a taphole periodically.

In operation of such a blast furnace, obtaining a residual amount and a liquid level of molten material such as molten pig iron and slag accumulated in the bottom portion of the blast furnace is important in deciding a tapping cycle and performing stable and economical operation. When the residual amount of the molten material increases and the liquid level of the molten material becomes too high, it is sometimes impossible to maintain stable operation due to a large fluctuation in blast pressure. Furthermore, when the liquid level of the molten material rises to a position close to the tuyere, the tuyere is blocked by the slag, and in the worst case, the furnace becomes inoperable. To stabilize the blast furnace that has become unstable due to a too high liquid surface of the molten material, it is necessary to take measures such as increasing an amount of coke charged through the furnace top and changing an amount of hot blast blown into the furnace through the tuyere. This invites an increase in cost for operation of the blast furnace.

As a technique for acquiring a residual amount of molten material, Patent Literature 1 discloses a method for measuring a voltage by passing a current through an electrode provided on a side surface of a blast furnace and measuring a liquid level of molten material on the basis of the measured voltage. Patent Literature 2 discloses a method for imaging a flow of molten pig iron slag discharged through a taphole by using a camera, calculating a discharge speed of the molten pig iron slag from the image thus acquired, and estimating a residual amount of molten material in a blast furnace on the basis of the discharge speed.

CITATION LIST

Patent Literature

PTL 1: Japanese Unexamined Patent Application Publication No. 2006-176805

PTL 2: Japanese Unexamined Patent Application Publication No. 2017-160498

Non Patent Literature

NPL 1: Takashi SUGIYAMA and three others, "Analysis on Liquid Flow in the Dripping Zone of Blast Furnace", Tetsu-to-Hagane, Vol. 73 (1987), No. 15, pp. 2044-2051

NPL 2: "Physical and chemical data book for iron- and steelmaking", Ironmaking (2006), The Iron and Steel Institute of Japan, p. 437

NPL 3: Yusuke KASHIHARA and four others, "Effect of Unconsumed Mixed Small Coke on Permeability in Lower Part of Blast Furnace", Tetsu-to-Hagane, Vol. 102 (2016), No. 12, pp. 661-668

NPL 4: Taihei NOUCHI and two others, "Effects of Operation Condition and Casting Strategy on Drainage Efficiency of the Blast Furnace Hearth", Tetsu-to-Hagane, Vol. 92 (2006), No. 12, pp. 269-274

SUMMARY

Technical Problem

However, according to the methods disclosed in Patent Literature 1 and Patent Literature 2, a special sensor or camera for measuring electric resistance or a potential resulting from molten material in a blast furnace or a speed of a flow of discharged tapping molten pig iron slag needs to be disposed in an environment where dust and the like are generated. Therefore, these methods undesirably require not only an initial cost for introducing equipment such as the special sensor or camera, but also a maintenance cost for maintaining the equipment. On the other hand, a liquid level of molten material can be detected without using a special sensor or camera by detecting a residual amount of molten material on the basis of a material balance between an amount of produced molten pig iron slag and an amount of molten pig iron slag discharged through the taphole and dividing the residual amount by a void fraction of a furnace bottom portion. However, according to this method, the liquid level of the molten material is detected assuming that the void fraction of the furnace bottom portion is constant although a state of coke filled in the furnace bottom portion is not uniform, and therefore the liquid level of the molten material cannot be detected with high accuracy. The disclosed embodiments were accomplished in view of such a problem of the conventional techniques, and an object of the disclosed embodiments is to provide molten material liquid level detection method and apparatus that can detect a liquid level of molten material from a residual amount of molten material with high accuracy and a method for operating the vertical furnace by using the detection method. Another object of the disclosed embodiments is to provide liquid level detection method and apparatus that can detect a liquid level of a liquid with high accuracy not only in a vertical furnace, but also in a container filled with a solid so that a solid-filled structure is formed.

Solution to Problem

A solution to the above problem is as follows.
[1] A liquid level detection method for detecting a liquid level of a liquid remaining in a bottom portion of a container after the liquid is discharged through a discharge hole provided in a lower portion of the container, the container being filled with a solid so that a solid-filled structure is formed and the liquid being contained in the container so as to infiltrate voids in at least a part of the solid-filled structure, the liquid level detection method including: calculating a void fraction of the solid-filled structure; and detecting the liquid level of the liquid after end of the discharge by using the calculated void fraction and a residual amount of the liquid after the end of the discharge.

[2] The liquid level detection method according to [1], wherein the void fraction of the solid-filled structure is calculated by using an inclination angle of a liquid surface of the liquid at the end of the discharge of the liquid through the discharge hole.

[3] A molten material liquid level detection method for detecting a liquid level of molten material remaining in a bottom portion of a vertical furnace after end of discharge of the molten material, the vertical furnace generating high-temperature reducing gas by burning carbon by using oxygen-containing gas blown through a lower portion of the vertical furnace, producing the molten material by causing the high-temperature reducing gas to melt and reduce an iron source raw material that is charged through a furnace top of the vertical furnace and forms a solid-filled structure in the vertical furnace, and discharging the molten material through a taphole of the vertical furnace, the molten material liquid level detection method including: calculating a void fraction of the solid-filled structure; and detecting the liquid level of the molten material after the end of the discharge by using the calculated void fraction and a residual amount of the molten material after the end of the discharge.

[4] The molten material liquid level detection method according to [3], wherein the void fraction of the solid-filled structure is calculated by using an inclination angle of a liquid surface of the molten material at the end of the discharge of the molten material through the taphole.

[5] The molten material liquid level detection method according to [3] or [4], wherein the void fraction is calculated by using a viscosity of the molten material calculated from a component concentration of the discharged molten material and a temperature of the molten material.

[6] The molten material liquid level detection method according to any one of [3] to [5], wherein the void fraction is calculated by using a discharge speed at the end of the discharge of the molten material calculated from a discharge amount, a discharge period, and an initial discharge speed of the discharge of the molten material.

[7] A method for operating a vertical furnace, the method including, in a case where the liquid level detected by the molten material liquid level detection method according to any one of [3] to [6] exceeds a predetermined threshold value, performing at least one of an operating action for lowering a production speed of the molten material and an operating action for discharging the molten material.

[8] A liquid level detection apparatus for detecting a liquid level of a liquid remaining in a bottom portion of a container after the liquid is discharged through a discharge hole provided in a lower portion of the container, the container being filled with a solid so that a solid-filled structure is formed and the liquid being contained in the container so as to infiltrate voids in at least a part of the solid-filled structure, the liquid level detection apparatus including a liquid level detection unit that calculates a void fraction of the solid-filled structure and detects the liquid level of the liquid after end of the discharge by using the calculated void fraction and a residual amount of the liquid after the end of the discharge.

[9] The liquid level detection apparatus according to [8], wherein the liquid level detection unit calculates the void fraction of the solid-filled structure by using an inclination angle of a liquid surface of the liquid at the end of the discharge of the liquid through the discharge hole.

[10] A molten material liquid level detection apparatus for detecting a liquid level of molten material remaining in a bottom portion of a vertical furnace after end of discharge of the molten material, the vertical furnace generating high-temperature reducing gas by burning carbon by using oxygen-containing gas blown through a lower portion of the vertical furnace, producing the molten material by causing the high-temperature reducing gas to melt and reduce an iron source raw material that is charged through a furnace top of the vertical furnace and forms a solid-filled structure in the vertical furnace, and discharging the molten material through a taphole of the vertical furnace, the molten material liquid level detection apparatus including a liquid level detection unit that calculates a void fraction of the solid-filled structure and detects the liquid level of the molten material after the end of the discharge by using the calculated void fraction and a residual amount of the molten material after the end of the discharge.

[11] The molten material liquid level detection apparatus according to [10], wherein the liquid level detection unit calculates the void fraction of the solid-filled structure by using an inclination angle of a liquid surface of the molten material at the end of the discharge of the molten material through the taphole.

[12] The molten material liquid level detection apparatus according to or [11], wherein the liquid level detection unit calculates the void fraction by using a viscosity of the molten material calculated from a component concentration of the discharged molten material and a temperature of the molten material.

[13] The molten material liquid level detection apparatus according to any one of to [12], wherein the liquid level detection unit calculates the void fraction by using a discharge speed at the end of the discharge of the molten material calculated from a discharge amount, a discharge period, and an initial discharge speed of the discharge of the molten material.

Advantageous Effects

The molten material liquid level detection method and detection apparatus for the same according to the disclosed embodiments calculates a void fraction of the solid-filled layer at the end of discharge of molten material and detects a liquid level of the molten material by using the void fraction, and therefore can detect the liquid level of the molten material from a residual amount of the molten material with high accuracy. As a result, an operating action based on the liquid level of the molten material can be performed with high accuracy, and therefore it is possible to avoid troubles of a vertical furnace more than a conventional technique and realize stable operation of the vertical furnace.

DETAILED DESCRIPTION

The disclosed embodiments will be described below based on an embodiment. In the present embodiment, a blast furnace is used as a vertical furnace, and a method and an apparatus for detecting a liquid level of molten material in the blast furnace are described. However, molten material liquid level detection method and detection apparatus for the same according to the disclosed embodiments are applicable not only to a blast furnace, but also to any vertical furnace into which an iron source raw material and coke are charged through a furnace top and oxygen-containing gas is blown through a lower portion of the furnace to produce molten material and that discharges the molten material through a taphole.

Figure 1:
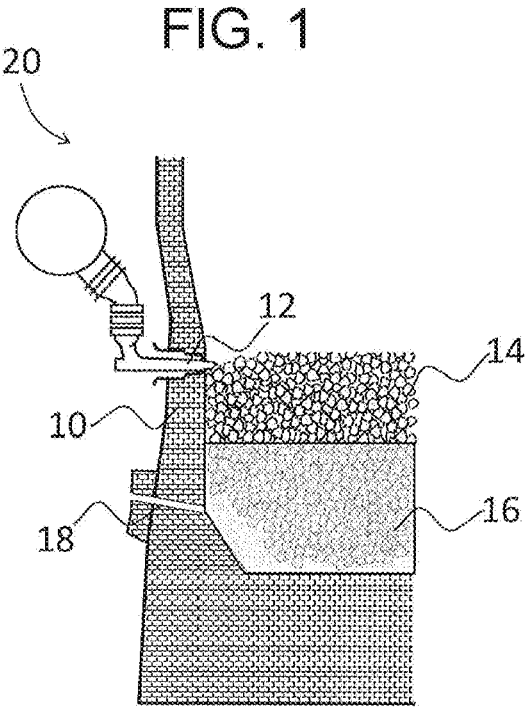
FIG. 1 is a cross-sectional view schematically illustrating a bottom portion of a blast furnace.

FIG. 1 is a cross-sectional view schematically illustrating a bottom portion of a blast furnace 20. Iron ore and coke, which are raw materials, are alternately charged into a furnace body 10 through a furnace top of the blast furnace 20 so as to form layers, and a hot blast, which is oxygen-containing gas, and a reductant such as pulverized coal are blown into the furnace body 10 through a tuyere 12 provided in a lower portion of the furnace body 10. Carbon contained in the coke and the pulverized coal is burned by the oxygen-containing gas blown through the tuyere 12. This generates high-temperature reducing gas. The high-temperature reducing gas melts and reduces the iron ore, and thereby molten pig iron is produced. The high-temperature reducing gas used to melt and reduce the iron ore is then discharged as furnace top gas through the furnace top. The produced molten pig iron and slag produced as a by-product when the molten pig iron is produced are accumulated in a furnace bottom portion and is discharged through the taphole 18 every predetermined period. In the present embodiment, the molten pig iron and slag are collectively referred to as molten material 16. The iron ore is an example of an iron source raw material.

A solid-filled structure 14 filled with the coke charged through the furnace top is formed in the bottom portion of the furnace body 10. The molten material 16 accumulated in the bottom portion of the furnace body 10 fills voids in the solid-filled structure 14. In a case where a speed at which the molten material 16 is discharged through the taphole 18 is higher than a speed at which the molten material 16 is produced, a residual amount of the molten material 16 in the bottom portion gradually decreases. When the residual amount of the molten material 16 decreases to such an extent that a liquid level of the molten material 16 becomes the same as the height of the taphole 18, the high-temperature reducing gas starts to be ejected from the furnace. When the high-temperature reducing gas stars to be ejected through the taphole 18, it becomes difficult to discharge the molten material 16 through the taphole 18. Therefore, another taphole is opened and the taphole 18 through which the high-temperature reducing gas is ejected is closed, and thereby the molten material 16 is continuously discharged from the furnace body 10.

Figure 2:
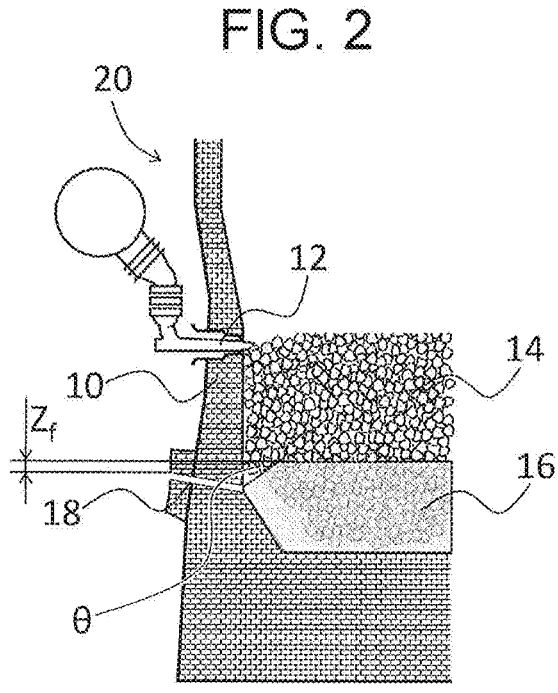
FIG. 2 is a cross-sectional view schematically illustrating the bottom portion of the blast furnace at the end of discharge.

FIG. 2 is a cross-sectional view schematically illustrating the bottom portion of the blast furnace 20 at the end of discharge. As illustrated in FIG. 2, a liquid surface of the molten material 16 is inclined toward the taphole 18 due to a pressure difference between an upstream side and a downstream side in flow of molten material that is caused by liquid flow resistance occurring due to viscosity and the like of the solid-filled structure 14 and the molten material 16. The molten material liquid level detection method and detection apparatus for the same according to the present embodiment calculate a void fraction of a solid-filled structure in a bottom portion from an inclination angle of a liquid surface of the molten material 16 at the end of discharge of the molten material 16 and detects the liquid level of the molten material 16 after the end of the discharge by using the void fraction. By thus calculating the void fraction of the solid-filled structure at the end of the discharge of the molten material 16, the liquid level of the molten material can be detected with high accuracy.

Figure 3:
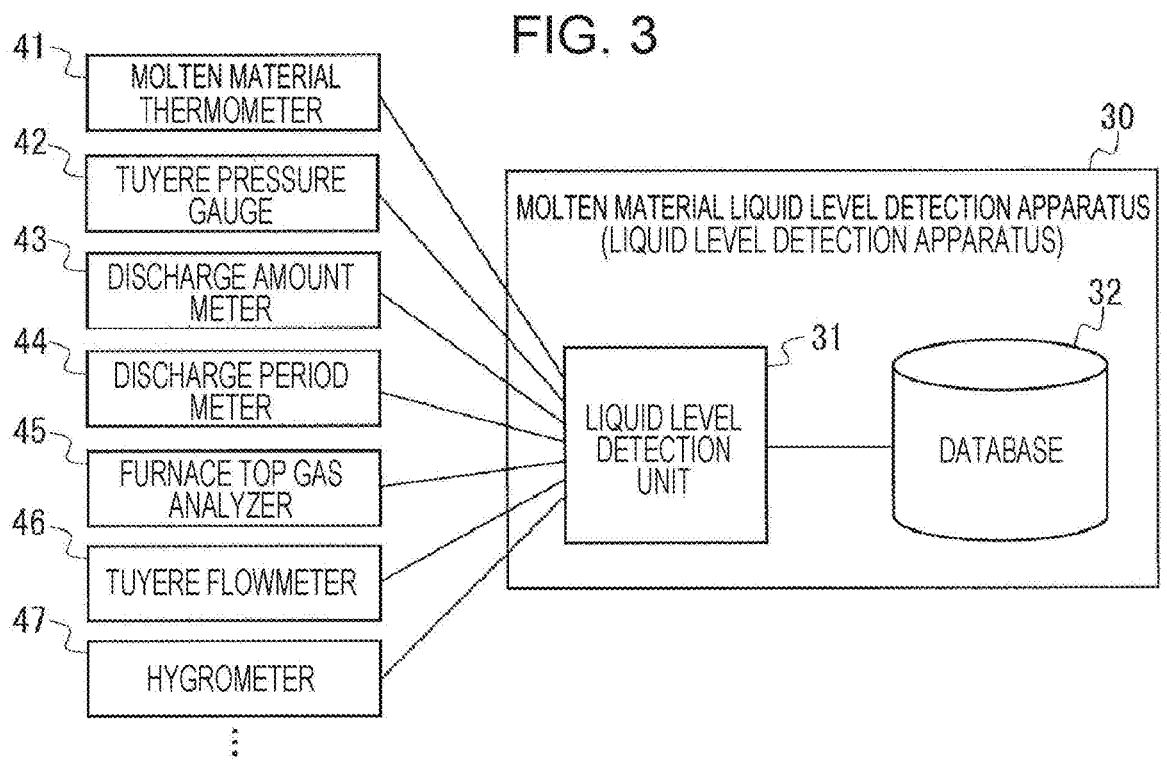
FIG. 3 is a block diagram of a liquid level detection apparatus.

FIG. 3 illustrates a configuration of a molten material liquid level detection apparatus 30 according to the present embodiment. As illustrated in FIG. 3, the molten material liquid level detection apparatus 30 includes a liquid level detection unit 31 that calculates a void fraction of the solid-filled structure 14 and detects a liquid level of the molten material 16 after the end of discharge. The liquid level detection unit 31 is realized by a general-purpose computer or the like including a central processing unit (CPU) that processes information and a storage device and perform calculation that will be described later. The molten material liquid level detection apparatus 30 further includes a database 32 in which various values used for the calculation that will be described later are stored in advance.

A method for detecting a liquid level of the molten material 16 after the end of discharge by the liquid level detection unit 31 of the molten material liquid level detection apparatus 30 is described below.

A height difference Z f between the height of the taphole 18 and the liquid level Z of the molten material 16 at the end of tapping, a hearth diameter $D_h$, and an inclination angle $\theta$ of the liquid surface of the molten material 16 satisfy the following formula (1).

[Math. 1]

$$Z_f = k \times D_h \times \sin\theta = k \times D_h \times \frac{180\mu}{\rho \times g \times d_p^2} \times \frac{(1-\varepsilon)^2}{\varepsilon^3} \times \frac{v_f}{S} \qquad (1)$$

In the above formula (1), $Z_f$ is a height difference (m) between the height of the taphole 18 and the liquid level Z of the molten material 16 at the end of discharge. k is a dimensionless arbitrary constant (−) that is experimentally found. The dimensionless arbitrary constant k is found by a method described in Non Patent Literature 4. For example, in the case of a typical blast furnace, k is 7.0. $D_h$ is a hearth diameter (m). $\mu$ is a viscosity (Pa·s) of the molten material 16. $\rho$ is a density (kg/m³) of the molten material 16. g is a gravitational acceleration (9.8 m/s²). dp is a particle diameter (m) of the solid-filled structure 14. $v_f$ is a void fraction (−) of the solid-filled structure 14. $v_f$ is a discharge speed ($m^3$/sec) of the molten material 16 at the end of discharge. S is a hearth cross-sectional area ($m^2$). Note that (−) means being dimensionless.

The liquid level Z of the molten material 16 is found by the following formula (2).

[Math. 2]

$$Z = \frac{V}{\rho \times S \times \varepsilon_{ave}} \tag{2}$$

In the above formula (2), Z is the liquid level (m) of the molten material 16. V is an amount (kg) of the molten material 16. $\rho$ is a density ($g/m^3$) of the molten material 16. S is a hearth cross-sectional area ($m^2$). $\varepsilon_{ave}$ is an average void fraction (−) of the solid-filled structure 14.

Although the viscosity p and the density p of the molten material 16 are viscosity and density of the molten pig iron and slag, the density and viscosity of the slag, which is more viscous and has large influence on a pressure loss, are used in the present embodiment. Although a constant value (0.25 Pa·s to 0.35 Pa·s) may be used as the viscosity p of the molten material 16, the viscosity p of the molten material 16 may be calculated by using a method described in Non Patent Literature 1, which is a method for calculating a viscosity from concentrations and temperatures of components such as CaO, MgO, $Al_2O_3$, $SiO_2$, and FeO. In a case where the viscosity of the molten material is estimated by the method described in Non Patent Literature 1, a temperature of the discharged molten material measured by a thermometer 41 such as a thermocouple may be used as a temperature of the molten material. Although a constant value (a value of a past record) may be used as the density p of the molten material 16, the density p of the molten material 16 may be calculated by using a weight ratio of FeO in molten slag by using the method described in Non Patent Literature 2.

In a case where coke is charged through the furnace top of the vertical furnace, the particle diameter d p of the solid-filled structure 14 may be an average particle diameter of the coke charged through the furnace top. As described in Non Patent Literature 3, a coke particle diameter taking into consideration an initial particle diameter distribution of coke charged through an upper portion of the furnace and influence of a change of the particle diameter distribution caused by chemical reaction, a physical shock, or the like during fall of the coke onto the bottom portion of the furnace may be used. The hearth cross-sectional area S is found from a furnace bottom diameter of the vertical furnace. As the average void fraction $\varepsilon_{ave}$, an initial value 0.4 of a void fraction $\varepsilon$ is used when the liquid level is calculated for the first time, and a void fraction calculated by the above formula (1) is used thereafter.

Next, a method for calculating the discharge speed $v_f$ of the molten material 16 at the end of discharge is described. The discharge speed $v_f$ of the molten material 16 at the end of discharge is found by using the following formula (3).

[Math. 3]

$$v = v_0 + a \times t \tag{3}$$

In the above formula (3), v is a discharge speed ($m^3$/sec) of the molten material 16. $v_0$ is an initial discharge speed ($m^3$/sec) of the molten material 16. t is a discharge period (sec). a is a discharge acceleration ($m^3$/$sec^2$). That is, in the present embodiment, the discharge speed $v_f$ of the molten material 16 is calculated by using the discharge acceleration a, the discharge period t, and the initial discharge speed $v_0$ of the molten material 16.

An amount M (kg) of molten material discharged during a discharge period T is calculated by the following formula (4).

[Math. 4]

$$\frac{M}{\rho} = \frac{1}{2} a \times T^2 + v_0 \times T \tag{4}$$

In the above formula (4), M is an amount (kg) of discharged molten material 16. T is a discharge period (sec). a is a discharge acceleration ($m^3$/$sec^2$). $v_0$ is an initial discharge speed ($m^3$/sec). $\rho$ is a density ($kg/m^3$) of the molten material 16.

Next, a method for calculating the initial discharge speed $v_0$ in the above formula (4) is described. A pressure loss calculated from a difference between energy of the molten material 16 close to a taphole and energy of the discharged molten material 16 and a pressure loss in the taphole calculated from the Darcy-Weisbach equation are found according to the Bernoulli's theorem. Assuming that these pressure losses are equal, the following formula (5) is derived.

[Math. 5]

$$P_{i-O} + \rho \times g \times Z_s - \frac{1}{2}\rho \times \left(\frac{v_0}{d_{th}}\right)^2 = \frac{1}{2}\lambda \times \rho \times \frac{L_{th}}{d_{th}} \times \left(\frac{v_o}{d_{th}}\right)^2 \tag{5}$$

In the above formula (5), $P_{i-O}$ is a pressure difference (atm) between an internal pressure of the vertical furnace and an atmospheric pressure. $\rho$ is a density ($kg/m^3$) of the molten material 16. g is a gravitational acceleration (9.8 m/$sec^2$). $Z_s$ is a difference (m) between a height of the molten material 16 and a height of the taphole 18 on an outlet side at the start of discharge. $d_{th}$ is a diameter (m) of the taphole 18. $\lambda$ is a coefficient of friction (−) of an inner wall of the taphole 18. Lth is a taphole depth (m). The taphole depth is a refractory length (m) over which the molten material 16 passes when tapped through the taphole 18. $v_0$ is an initial discharge speed ($m^3$/sec).

The coefficient of friction A of the inner wall of the taphole 18 is found by the following formula (6) by using the Swamee-Jain equation.

[Math. 6]

$$\frac{\lambda}{4} = \frac{0.0626}{\left[\log\left\{\frac{e}{3.7 \times d_{th}} + \frac{5.74}{\left(\frac{\rho \times v_0 \times d_{th}}{S_{dh} \times \mu}\right)^{0.9}}\right\}\right]^2} \tag{6}$$

In the above formula (6), $\lambda$ is the coefficient of friction (−) of the inner wall of the taphole 18. e is a surface roughness (m) of the taphole inner wall. $d_{th}$ is a diameter (m) of the taphole 18. $\rho$ is a density ($kg/m^3$) of the molten material 16. $v_0$ is an initial discharge speed ($m^3$/sec). $S_{dh}$ is a cross-sectional area of the taphole 18. $\mu$ is a viscosity (Pa·s) of the molten material 16.

The internal pressure of the vertical furnace is obtained by a pressure gauge 42 provided in the tuyere 12. As the atmospheric pressure, a typical value may be used. A height of the molten material 16 at the start of discharge is found by substituting the residual amount V of the molten material 16 at the start of discharge into the above formula (2). Note that a height of the molten material 16 at the start of discharge is calculated by substituting an initial residual amount $V_0$ into the above formula (2). Since a height of the molten material 16 in a blast furnace typically stays at a level higher by 1 m to 2 m than a taphole, the initial residual amount $V_0$ is calculated in accordance with the capacity of the furnace body 10 so that the height of the molten material 16 becomes 1 m to 2 m higher than the taphole. The height of the taphole 18 on an outlet side is found by measuring the position of the taphole 18. Since the taphole 18 is bored by using a drill, the diameter $d_{th}$ of the taphole 18 is found by measuring a diameter of the drill. The taphole depth Lth is found by measuring a length of intrusion of the drill during boring of the taphole 18.

Although the surface roughness e of the taphole inner wall varies depending on a boring method, a taphole mix, an elapsed period from the start of tapping, and the like, it has been confirmed from operation analysis that it is appropriate to use a value within a range of 0.0001 m to 0.01 m. The cross-sectional area $S_{dh}$ of the taphole 18 is found by the following formula (7) by using the diameter $d_{th}$ of the taphole 18.

$$S_{dh}=(d_{th}/2)^2 \times \pi \tag{7}$$

The initial discharge speed $v_0$ can be found by solving the above formulas (5) and (6). The discharge acceleration a can be found by using $v_0$, an actual measurement value of the amount M of discharged molten material 16 measured by a discharge amount meter 43, an actual measurement value of the discharge period T of the molten material 16 measured by a discharge period meter 44, and the above formula (4). In a case where the initial discharge speed $v_0$ and the discharge acceleration a can be found, the discharge speed $v_f$ of the molten material 16 can be calculated by using the above formula (3).

The residual amount of the molten material 16 can be calculated by calculating a difference between an amount of produced molten material 16 and an amount of discharged molten material. The amount of produced molten material 16 may be calculated by using a production speed PV of the molten material 16 calculated by using the following formula (8).

[Math. 7]

$$PV = \frac{\left(TV \times F_o - \frac{BV \times E_0}{22.4} \times 2\right)}{OM} \times M_M \tag{8}$$

In the formula (8), PV is a production speed (kg/sec) of molten material. TV is a flow rate ($Nm^3$/sec) of furnace top gas. Fo is an amount concentration (mol/$Nm^3$) of 0 atoms in the furnace top gas. BV is a flow rate ($Nm^3$/sec) of hot blast blown through the tuyere 12. $E_0$ is a volume fraction (−) of oxygen in the hot blast. OM (−) is a ratio of the number of oxygen atoms to the number of metal atoms per 1 mol of a material to be reduced among raw materials. $M_M$ is an atomic weight (g/mol) of the metal atoms.

The flow rate TV of the furnace top gas is calculated by the following formula (9).

$$TV=BV \times E_N/F_N \tag{9}$$

In the formula (9), TV is a flow rate ($Nm^3$/sec) of the furnace top gas. BV is a flow rate ($Nm^3$/sec) of the hot blast blown through the tuyere 12. $E_N$ is a volume fraction (−) of nitrogen in the hot blast. $F_N$ is a volume fraction (−) of nitrogen in the furnace top gas.

The amount concentration $F_0$ of the O atoms and the volume fraction $F_N$ of nitrogen in the furnace top gas are obtained by analyzing the furnace top gas by using a furnace top gas analyzer 45 by gas chromatography or infrared spectroscopy. The flow rate BV of the hot blast blown through all of the tuyeres 12 is obtained by flowmeters 46 provided in the tuyeres 12.

The volume fraction $E_O$ of oxygen in the hot blast can be calculated by the following formula (10). The volume fraction E N of nitrogen in the hot blast can be calculated by the following formula (11).

$$E_O=(X \times 0.21+Y)/(X+Y) \tag{10}$$

$$E_N=(X \times 0.79)/(X+Y) \tag{11}$$

In the formulas (10) and (11), X is a flow rate ($Nm^3$/sec) of blown air. Y is a flow rate ($Nm^3$/sec) of blown oxygen.

The volume fraction $E_O$ of oxygen in the hot blast and the volume fraction $E_N$ of nitrogen in the hot blast may be calculated by the following formulas (12) and (13) in consideration of moisture in the air.

$$E_O=(X \times 0.21+Y)/[X+Y+X \times (Z/18) \times 22.4] \tag{12}$$

$$E_N=(X \times 0.79)/[X+Y+X \times (Z/18) \times 22.4] \tag{13}$$

In the above formulas (12) and (13), X is a flow rate ($Nm^3$/sec) of blown air. Y is a flow rate ($Nm^3$/sec) of blown oxygen. Z is moisture (kg/$m^3$) in the air. The moisture Z in the air is obtained by measuring the air by a hygrometer 47.

The ratio OM of the number of oxygen atoms to the number of metal atoms per 1 mol of a material to be reduced among raw materials is found from a component concentration of the raw materials measured by chemical analysis. The molten material 16 is a mixture of a molten metal and other slag. It is therefore preferable to add a production speed of the slag to the production speed PV of the molten material 16 calculated by the above formula (8). In this case, the production speed of the slag is found by calculating a mass ratio of a molten oxide to the molten metal from the component concentration of the raw materials and multiplying the production speed of the molten metal by the mass ratio.

The discharge speed v of the molten material 16 is calculated by using the above formula (3). A residual amount of the molten material 16 accumulated in the bottom portion of the furnace body 10 can be detected from a difference between the production speed PV of the molten material 16 and the discharge speed v of the molten material 16 thus found. Specifically, a residual amount of the molten material 16 at any time t (sec) is detected by using the following formula (14).

[Math. 8]

$$V = V_0 + \int \left(PV(t) - \frac{v(t)}{\rho}\right) dt \tag{14}$$

In the above formula (14), V is a residual amount (kg) of the molten material 16. $V_0$ is an initial residual amount (kg) of the molten material 16. PV is a production speed (kg/sec) of the molten material 16. v is a discharge speed ($m^3$/sec) of the molten material 16. $\rho$ is a density (kg/m$^3$) of the molten material 16. The initial residual amount $V_0$ is a constant value set in accordance with a capacity of the furnace body 10. Since a height of the molten material 16 in a blast furnace typically stays at a level higher by 1 m to 2 m than a taphole, the initial residual amount $V_0$ is set in accordance with the capacity of the furnace body 10 so that the height of the molten material 16 becomes 1 m to 2 m higher than the taphole, as described above. The residual amount V of the molten material 16 at any time t (sec) can be detected by using the above formula (12).

As described above, the molten material liquid level detection method and detection apparatus for the same according to the present embodiment calculate a void fraction of a solid-filled layer at the end of discharge of molten material and detect a liquid level of the molten material by using the void fraction, and therefore can detect the liquid level of the molten material from a residual amount of the molten material with high accuracy. This makes it possible to perform an operating action based on the liquid level of the molten material with high accuracy, thereby making it possible to avoid a trouble of a vertical furnace more than a conventional technique and realize stable operation of a vertical furnace.

It is preferable to perform an operation action for lowering the production speed of the molten material 16 in a case where the liquid level of the molten material 16 detected by using the above formula (2) exceeds a predetermined threshold value. This makes it possible to prevent the liquid level of the molten material 16 from becoming too high, thereby avoiding occurrence of troubles such as deterioration in gas permeability and tuyere blockage with slag. The action for lowering the production speed of the molten material 16 is, for example, to reduce an amount of hot blast blown through the tuyere 12. An operating action for increasing the discharge speed of the molten material 16 may be performed instead of or together with the operating action for lowering the production speed of the molten material 16.

Although a method for finding the residual amount of the molten material 16 by using the production speed PV of the molten material, the discharge speed v of the molten material, and the above formula (14) has been described in the above example, this is not restrictive. An amount of produced molten material 16 may be calculated from an amount of raw materials charged through the furnace top and a component concentration of the raw materials. Furthermore, an amount of discharged molten material 16 may be calculated by measuring a change in weight of a torpedo car for storing molten pig iron and an amount of granulated slag produced from slag. The residual amount of the molten material 16 may be calculated by finding a difference between the amount of the produced molten material 16 and the amount of the discharged molten material 16.

Furthermore, by partially changing the molten material liquid level detection method and detection apparatus for the same, a liquid level of a liquid contained not only in a blast furnace or a vertical furnace, but also in any container having a solid-filled structure therein can be detected. That is, a liquid level of a liquid remaining in a bottom portion of a container can be detected after the liquid that is contained in the container so as to infiltrate voids in at least a part of the solid-filled structure is discharged through a discharge hole provided in a lower portion of the container.

Specifically, a liquid level detection apparatus 30 according to the present embodiment calculates a void fraction of a solid-filled structure in a similar manner to the molten material liquid level detection apparatus 30. Then, a liquid level of a liquid after the end of discharge is detected by using the calculated void fraction and a residual amount of liquid after the end of discharge.

The liquid level detection method and detection apparatus for the same according to the present embodiment are applicable not only to a blast furnace process, but also to any process in any container having a solid-filled structure therein in which a liquid is contained so as to infiltrate voids in at least a part of the solid-filled structure.

Examples

Next, an Example is described. In the present Example, an inclination angle of molten material was calculated from a residual amount of the molten material every time discharge of the molten material ended, and an average void fraction Save of a solid-filled structure was calculated from the inclination angle of the molten material. The residual amount of the molten material was calculated at the end of discharge of the molten material by using operation conditions and measurement values in operation of a blast furnace and the above formula (14). Then, a liquid level of the molten material was detected by using the residual amount of the molten material and the calculated average void fraction $\varepsilon_{ave}$. On the other hand, in a comparative example, the void fraction was fixed to 0.42, and a liquid level of the molten material was detected by using the void fraction and the residual amount of the molten material.

Not only was the residual amount of the molten material detected, but also a gas flow resistance index K during operation of the blast furnace was calculated. The gas flow resistance index K is a typical index for evaluating gas permeability of the vertical furnace and is calculated by the following formula (15).

[Math. 9]

$$K = \frac{\left((1033Pb)^2 - (1033Pt)^2\right)}{(BV \times 60)^{1.7}} \tag{15}$$

In the above formula (15), $P_b$ is a blast pressure (atm) of hot blast blown through a tuyere. $P_t$ is a discharge pressure (atm) of the furnace top gas. BV is a rate (Nm$^3$/sec) of hot blast blown through all tuyeres.

A gas flow resistance index ratio $K_r$ is a value calculated by the following formula (16) where $K_{ave}$ is an average gas flow resistance index of a target vertical furnace.

[Math. 10]

$$K_r = \frac{K}{K_{ave}} \tag{16}$$

Figure 4:
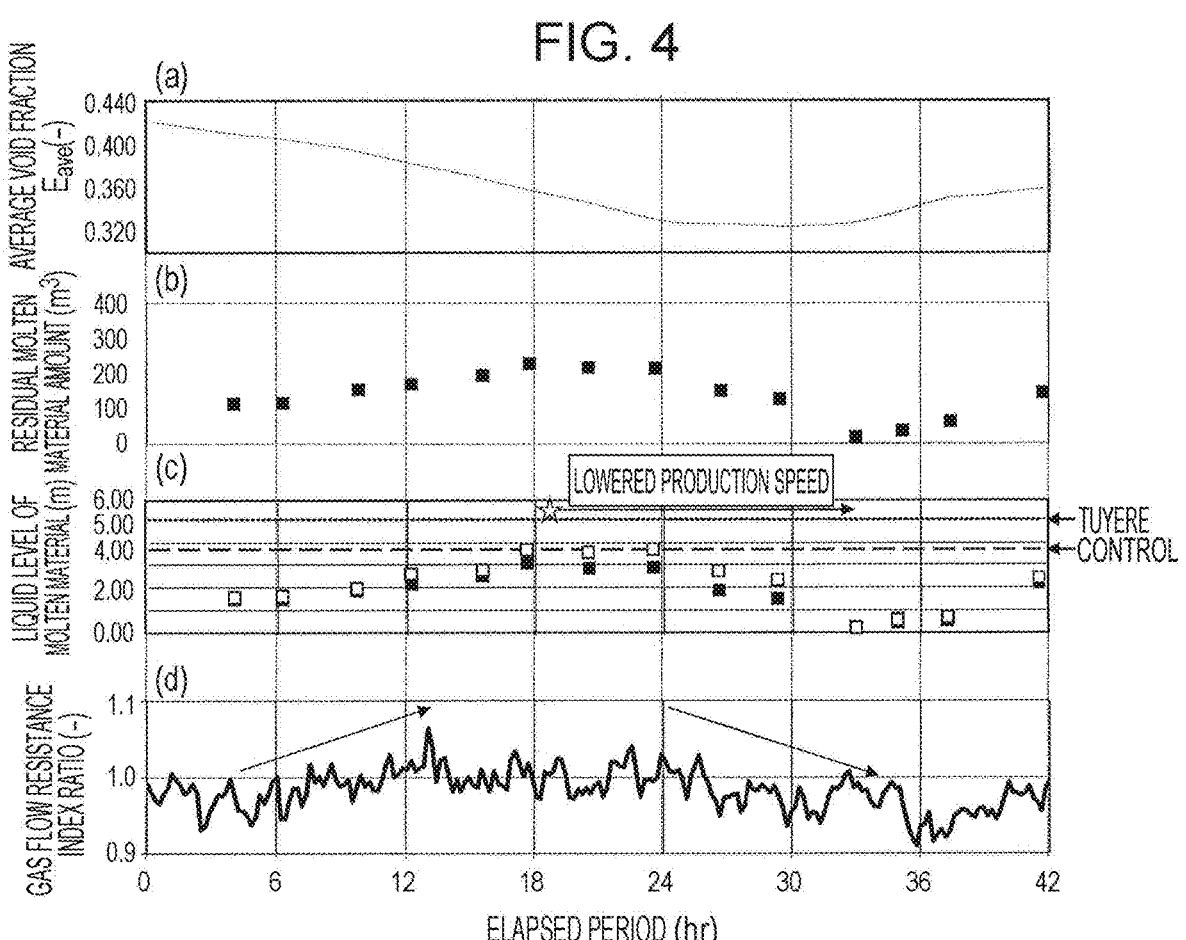
FIG. 4 is a graph illustrating a result of an Example.

FIG. 4 is a graph illustrating a result of Example. FIG. 4(*a*) illustrates a fluctuation of the average void fraction $\varepsilon_{ave}$ (−). The average void fraction $\varepsilon_{ave}$ (−) is a moving average of c in one day. FIG. 4(*b*) illustrates a fluctuation of a residual amount (m$^3$) of molten material. FIG. 4(*c*) illustrates a fluctuation of a liquid level (m) of the molten material, and the white rectangle plots indicate a liquid level detected by using the void fraction illustrated in FIG. 4(*a*) and indicate the Example. The black rectangle plots indicate a liquid level detected by using the void fraction 0.42 and indicate the comparative example. Furthermore, the dashed line in FIG. 4(*c*) indicates a control value of the molten material liquid level, and the dotted line indicates a height of the tuyere. That is, a position lower than the height of the tuyere is set as the control value of the molten material liquid level so that the liquid level of the molten material does not reach the position of the tuyere. FIG. 4(*d*) illustrates a fluctuation of a gas flow resistance index ratio (–).

As illustrated in FIG. 4(*a*), the void fraction of the solid-filled structure continued to decrease until 30 hours elapsed, and then increased. In FIG. 4(*c*) illustrating the liquid level of the molten material, due to the decrease in void fraction, the white rectangle plots of the Example using the void fraction of FIG. 4(*a*) became higher than the black rectangle plots of the comparative example in which the void fraction was set to a constant value (0.42). As a result, the liquid level of the molten material indicated by the white rectangle plots exceeded the control value after elapse of 18 hours, and therefore an operating action for lowering a production speed of molten pig iron was performed. As a result, the residual amount of the molten material started to decrease after elapse of 20 hours, and the liquid level of the molten material decreased accordingly.

As illustrated in FIG. 4(*d*), the gas flow resistance index ratio rose in accordance with the increase in molten material amount and the rise in liquid level of the molten material. The rise in gas flow resistance index ratio means a decrease in furnace gas permeability, and therefore when the gas flow resistance index ratio rises, blast furnace operation becomes unstable. However, since the amount of the molten material was decreased by performing an operating action for lowering the production speed of the molten pig iron after elapse of 18 hours, the gas flow resistance index ratio also decreased, and stable operation of the blast furnace was realized.

On the other hand, in a case where the void fraction was set to a constant value (0.42), the residual amount of the molten material markedly increased after elapse of 18 hours and before elapse of 21 hours, and there was a risk that the liquid level of the molten material reached the position of the tuyere. Even when the liquid level of the molten material does not reach the position of the tuyere, the gas flow resistance index ratio rises markedly, and operation of the blast furnace becomes unstable, and therefore stable operation of the blast furnace cannot be realized.

As described above, the molten material liquid level detection method and detection apparatus for the same according to the present embodiment, the void fraction of the solid-filled structure is calculated at the end of discharge of molten material, and a liquid level of the molten material was detected by using the void fraction. This makes it possible to detect the liquid level of the molten material from a residual amount of the molten material with high accuracy. As a result, an operating action based on the liquid level of the molten material can be performed with high accuracy, and therefore it is possible to avoid troubles of a vertical furnace more than a conventional technique and realize stable operation of the vertical furnace.

The invention claimed is:

1. A molten material liquid level detection method for detecting a liquid level of molten material remaining in a bottom portion of a vertical furnace after an end of discharge of the molten material, the vertical furnace generating high-temperature reducing gas by burning carbon by using oxygen-containing gas blown through a lower portion of the vertical furnace, producing the molten material by causing the high-temperature reducing gas to melt and reduce an iron source raw material that is charged through a furnace top of the vertical furnace and forms a solid-filled structure in the vertical furnace, and discharging the molten material through a taphole of the vertical furnace, the molten material liquid level detection method comprising:

calculating a void fraction of the solid-filled structure; and detecting the liquid level of the molten material after the end of the discharge based on the calculated void fraction and a residual amount of the molten material after the end of the discharge, wherein the void fraction of the solid-filled structure is calculated based on an inclination angle of a liquid surface of the molten material at the end of the discharge of the molten material through the taphole.

2. The molten material liquid level detection method according to claim 1, wherein the void fraction is calculated based on a viscosity of the molten material calculated from a component concentration of the discharged molten material and a temperature of the molten material.

3. The molten material liquid level detection method according to claim 1, wherein the void fraction is calculated based on a discharge speed at the end of the discharge of the molten material calculated from a discharge amount, a discharge period, and an initial discharge speed of the discharge of the molten material.

4. A method for operating a vertical furnace, the method comprising, in a case where the liquid level detected by the molten material liquid level detection method according to claim 1 exceeds a predetermined threshold value, performing at least one of an operating action for lowering a production speed of the molten material and an operating action for discharging the molten material.

5. A molten material liquid level detection apparatus for detecting a liquid level of molten material remaining in a bottom portion of a vertical furnace after an end of discharge of the molten material, the vertical furnace generating high-temperature reducing gas by burning carbon by using oxygen-containing gas blown through a lower portion of the vertical furnace, producing the molten material by causing the high-temperature reducing gas to melt and reduce an iron source raw material that is charged through a furnace top of the vertical furnace and forms a solid-filled structure in the vertical furnace, and discharging the molten material through a taphole of the vertical furnace, the molten material liquid level detection apparatus comprising a liquid level detection unit that calculates a void fraction of the solid-filled structure and detects the liquid level of the molten material after the end of the discharge based on the calculated void fraction and a residual amount of the molten material after the end of the discharge, wherein the liquid level detection unit calculates the void fraction of the solid-filled structure based on an inclination angle of a liquid surface of the molten material at the end of the discharge of the molten material through the taphole.

6. The molten material liquid level detection apparatus according to claim 5, wherein the liquid level detection unit calculates the void fraction based on a viscosity of the molten material calculated from a component concentration of the discharged molten material and a temperature of the molten material.

7. The molten material liquid level detection apparatus according to claim 5, wherein the liquid level detection unit calculates the void fraction based on a discharge speed at the end of the discharge of the molten material calculated from a discharge amount, a discharge period, and an initial discharge speed of the discharge of the molten material.

8. A molten material liquid level detection apparatus for detecting a liquid level of molten material remaining in a bottom portion of a vertical furnace after an end of discharge of the molten material, the vertical furnace generating high-temperature reducing gas by burning carbon by using oxygen-containing gas blown through a lower portion of the vertical furnace, producing the molten material by causing the high-temperature reducing gas to melt and reduce an iron source raw material that is charged through a furnace top of the vertical furnace and forms a solid-filled structure in the vertical furnace, and discharging the molten material through a taphole of the vertical furnace, the molten material liquid level detection apparatus comprising a processor configured to execute the steps of:

calculating a void fraction of the solid-filled structure; and detecting the liquid level of the molten material after the end of the discharge based on the calculated void fraction and a residual amount of the molten material after the end of the discharge, wherein the void fraction of the solid-filled structure is calculated based on an inclination angle of a liquid surface of the molten material at the end of the discharge of the molten material through the taphole.

\* \* \* \* \*